United States Patent [19]

Shanahan et al.

[11] 4,048,747

[45] Sept. 20, 1977

[54] BASEBOARD TRAP FOR CRAWLING INSECTS

[75] Inventors: Francis V. Shanahan, Valley Stream; Herman H. Feller, Brooklyn, both of N.Y.

[73] Assignee: Stick-M-All, Inc., Valley Stream, N.Y.

[21] Appl. No.: 713,779

[22] Filed: Aug. 12, 1976

[51] Int. Cl.² ............................................. A01M 1/14
[52] U.S. Cl. ..................................................... 43/114
[58] Field of Search ................................. 43/114, 121

[56] References Cited

U.S. PATENT DOCUMENTS

| 2,911,756 | 11/1959 | Geary | 43/114 |
| 3,816,956 | 6/1974 | Sekula | 43/114 |

FOREIGN PATENT DOCUMENTS

| 928,589 | 6/1947 | France | 43/121 |
| 173,564 | 7/1906 | Germany | 43/114 |

Primary Examiner—Hugh R. Chamblee
Assistant Examiner—Daniel J. Leach
Attorney, Agent, or Firm—Alan H. Levine

[57] ABSTRACT

A trap including an elongated base for mounting along the bottom of a wall at the juncture between the wall and floor. A tape having pressure-sensitive adhesive on both faces is mounted on the base, and extends along substantially the entire length of the base. An elongated cover extends along the base and conceals the tape, the cover being spaced from the floor to provide access for crawling insects to the base and tape.

8 Claims, 5 Drawing Figures

U.S. Patent  Sept. 20, 1977  4,048,747
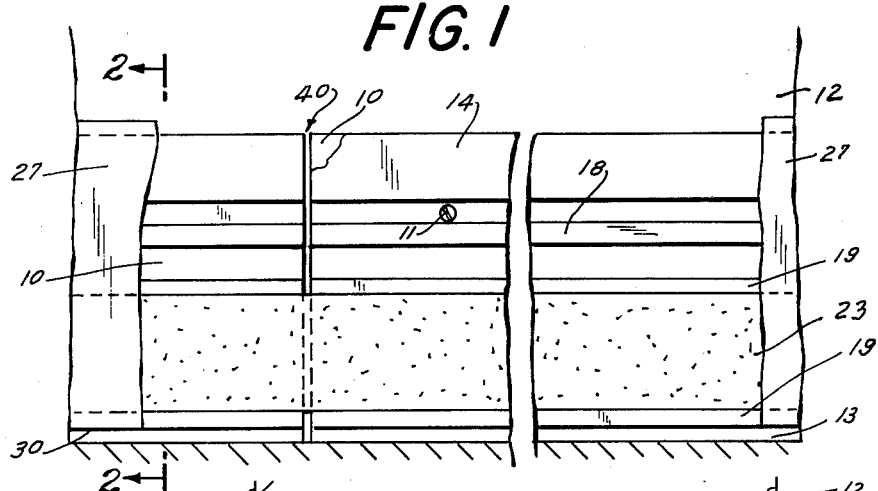
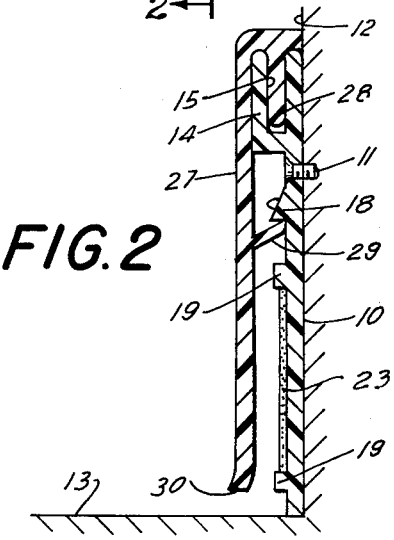
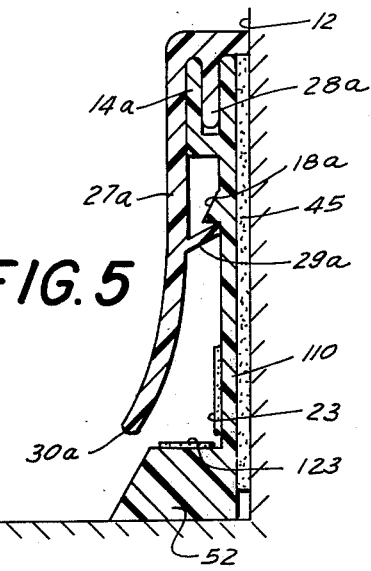
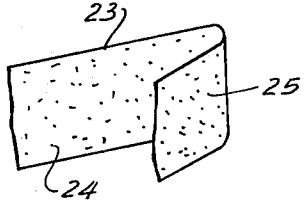
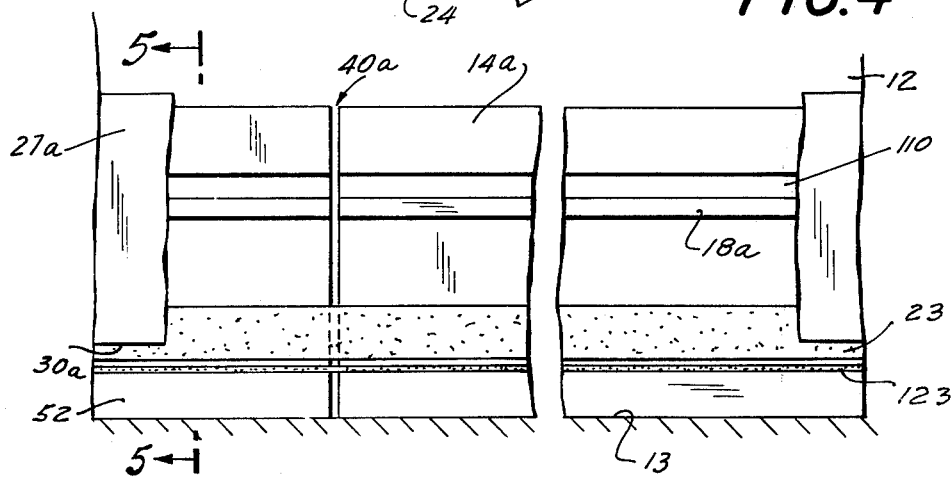

BASEBOARD TRAP FOR CRAWLING INSECTS

This invention relates to insect traps, and more particularly to an adhesive trap for crawling insects.

For many years, a recurring problem has involved attempts to rid places such as living quarters and commercial establishments of crawling insects. A common way of dealing with the problem of crawling insects is to spread poison at regular intervals around the area to be protected. This is a time-consuming and expensive procedure, and involves a certain degree of risk. Electrified traps which electrocute the insects on contact have also been suggested, but these discontinue functioning should there be a power failure.

It is an object of the present invention to provide a crawling insect trap which, once installed, operates continuously with very little care of maintenance.

It is another object of the invention to provide an adhesive or tacky crawling insect trap which makes no use of poisons or other chemicals, and which needs no electrical power.

It is a further object of the present invention to provide an adhesive crawling insect trap which is completely unobtrusive so that the casual observer will not be aware of its existence.

It is an additional object of the invention to provide an adhesive crawling insect trap which has the form of a conventional baseboard, and hence which can either take the place of a conventional baseboard in a room, or which can be mounted directly on an existing baseboard.

It is another object of the invention to provide an adhesive baseboard trap for crawling insects which includes a removable cover so as to provide easy access to the adhesive portion of the trap for cleaning and maintenance process.

A further object of the invention is to provide an adhesive baseboard trap for crawling insects which is inexpensive to manufacture and easy to install with no, or a minimum use of, tools.

A special feature of the invention involves the use of tape bearing a pressure-sensitive adhesive on both sides, the adhesive on one side being used to secure the tape of the base of the trap, and the adhesive on the other side used to snare the insects.

Additional objects and features of the invention will be apparent from the following description, in which reference is made to the accompanying drawings.

In the drawings:

FIG. 1 is a fragmentary elevational view of an adhesive baseboard trap for crawling insects according to the present invention;

FIG. 2 is a vertical cross-sectional view taken along line 2—2 of FIG. 1;

FIG. 3 is a fragmentary perspective view of the adhesive tape of the trap;

FIG. 4 is a fragmentary elevational view of another embodiment of an adhesive baseboard trap for crawling insects according to the present invention; and FIG. 5 is a vertical cross-sectional view taken along line 5—5 of FIG. 4.

One embodiment of an adhesive baseboard trap for crawling insects chosen to illustrate the present invention is shown in FIGS. 1 and 2. The trap includes a base 10, which may be a metal or plastic extrusion. Base 10 is an elongated flat plate intended to be mounted, such as by screws 11, along the bottom of a wall 12 at the juncture between the wall 12 and floor 13. Wall 12 and floor 13 are, of course, part of the room which is to be rid of crawling insects, such a cockroaches and ants. A projection 14, having an L-shaped cross-section, extends along the entire length of base 10 near the upper edge of the base. Projection 14, together with the upper portion of base 10, defines an upwardly-opening channel 15.

Beneath projection 14, base 10 is formed with a detent 18 extending along the entire length of the base. Detent 18 has a horizontal bottom surface and an inclined upper surface. Beneath detent 18, the front face of base 10 is formed with two vertically spaced-apart ribs 19 extending along the entire length of base 10.

An elongated strip of tape 23 (see also FIG. 3) extends along the entire length of base 10, in the region between ribs 19. Tape 23 has pressure sensitive adhesive on both faces, the adherent strength of the adhesive 24 on one face preferably being greater than the strength of the adhesive 25 on the other face. Tape 23 is secured to the face of base 10 by the adhesive on one face, preferably the adhesive 25 of lower strength. The higher strength adhesive 24 is thereby exposed on the outer face of the tape.

A cover 27, which may be a metal or plastic extrusion, extends along the entire length of base 10. The top wall of cover 27 is formed with a downwardly projecting tongue 28 adapted to fit into channel 15. The rear face of cover 27 is provided with a rearwardly projecting rib 29 which inclines upwardly and rearwardly. As may be seen clearly in FIG. 2, tongue 28 and rib 29 cooperate with channel 15 and detent 18, respectively, to hold cover 27 in place on base 10. In this position, the bottom edge 30 of cover 27 is spaced above floor 13. Cover 27 may readily be removed from base 10 by simply extending the fingers beneath lower edge 30 and pulling the cover outwardly to release the engagement between rib 29 and detent 18. Cover 27 can then be lifted to slide tongue 28 out of channel 15. Replacing cover 27 is just as simple, except that the steps are reversed. The manipulations just described are permitted due to the inherent resiliency of the material from which cover 27 is fabricated.

Since base 10 is provided in finite lengths, it happens from time-to-time that two lengths of base 10 are butted end-to-end, as shown in FIG. 1, the line of separation between the two lengths being indicated at 40. In such a case, tape 23 can simply extend across and bridge the line of separation 40, as shown in FIG. 1.

Another embodiment of the invention is illustrated in FIGS. 4 and 5. The parts of this embodiment which are comparable to the parts shown in FIGS. 1 and 2 bear the same reference numerals as are used in FIGS. 1 and 2 followed by an *a*.

A difference between the embodiment shown in FIGS. 1 and 2 and that shown in FIGS. 4 and 5 is that base 110 is provided on its rear face with a pressure-sensitive adhesive coating 45, and this adhesive coating is used to mount base 110 on wall 12. In this way, base 110 can be mounted without the use of any tools whatsoever. If necessary, a nail or screw may be provided at widely spaced-apart distances along the length of base 10 to insure its attachment to the wall.

In this embodiment, base 110 is formed with a foot portion 52 projecting forwardly from the bottom portion of the base and extending along the entire length of the base. The upper surface of foot portion 52 and the front surface of base 110 bear lengths of adhesive tape 23 and 123 having pressure sensitive adhesive on both faces.

An advantage of this embodiment is that one of the tapes 123 is arranged on a horizontal surface and the other tape 23 on a vertical surface, as compared to the embodiment of FIGS. 1 and 2 wherein tape is arranged only on a vertical surface. With the embodiment of FIGS. 4 and 5, an insect may be caught more readily by tape 123 mounted on the horizontal surface then by the tape 23 mounted vertically. Also, should the insect fall from tape 23, it will adhere to tape 123.

It will be appreciated that with both embodiments of the present invention, base 10, 110 may be cut to length, and tape 23, 123 also cut to appropriate length, so that the trap can be tailored to fit a room of any size.

In use, once the trap has been installed, insects which crawl beneath the lower edge 30, 30a of cover 27, 27a and move on to touch the adhesive-bearing tape 23, 123 will be caught. The trap of the present invention is particularly effective since crawling insects tend to run toward the walls of a room in order to find shelter from the light when a light is turned on in the room. Thus, as the insects attempt to find darkness beneath cover 27, 27a, they will get stuck on the tape and eventually die.

After a period of time, the tape 23, 123 will be covered, or substantially covered with dead insects. As that time, the tape can be removed by pulling it away from base 10, 110. For this purpose, an end of the tape can be left without adhesive, or the adhesive can be covered at the end of the tape with paper or other material to define a pull tab. A fresh strip of double-sided adhesive tap is then applied to base 10, 110 to replace the tape just removed. Ribs 19 serve as guides to indicate where the fresh tape should be placed. The embodiment of FIGS. 4 and 5 may also be provided with such ribs, or with lines to guide the placement or new tape. Cover 27, 27a is of course removed durng the replacement of spent tape with fresh tape, and the cover then replaced.

If desired, an appropriate scent can be applied to the tapes 23, 123 or the region of the base 10, 110, directly adjacent to the tapes, which will attract roaches, or other crawling pests, to the tapes. Such scents are available commercially, and one chemical which has this characteristic is 2, 2-dimethyl-3-isopropylidenecyclopropyl.

On advantages feature of the invention is that the adhesive 24 on one face of the tape is of lower adherent strength than the adhesive 25, and that the lower strength adhesive is used to secure the tape to base 10, 110. In this way, tape 23, 123 can be removed without difficulty from the base when desired, but at the same time the adhesive on the exposed face of the tape is strong enough to assuredly hold any insect which touches it.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A baseboard trap for crawling insects, comprising:
   a. a flat elongated base,
   b. means for securing said base along the bottom of a wall at the juncture between the wall and floor of a room,
   c. a strip of tape bearing a pressure-sensitive adhesive on its exposed face on said base, said strip extending along substantially the entire length of said base, and
   d. an elongated cover extending along but spaced from said base, said cover concealing said tape, and the lower edge of said cover being spaced fron the room floor to provide access for crawling insects to said base and tape.

2. A baseboard trap as defined in claim 1 wherein said tape bears pressure-sensitive adhesive on both its faces, said tape being secured to said base by the adhesive on one face of said tape.

3. A baseboard trap as defined in claim 2 wherein the adhesive on the face of said which is exposed is of greater adherent strength than the adhesive which secures said tape to said base.

4. A baseboard trap as defined in claim 1 including means for removably securing said cover to said base.

5. A baseboard trap defined in claim 4 wherein said securing means includes two spaced-apart elements carried by said base and two spaced-apart elements on said cover cooperable with said elements on said base for holding said cover on said base, said elements being engageable and disengageable without the use of tools and other fasteners.

6. A baseboard trap as defined in claim 1 wherein said means for securing said base to said wall includes a pressure-sensitive adhesive carried by the back face of said base.

7. A baseboard trap as defined in claim 1 including a foot portion projecting forwardly from the lower part of said base, said foot portion having an upper surface forming a dihedral angle with the front surface of said base, and a strip of tape bearing a pressure-sensitive adhesive on its exposed face being mounted on each of said surfaces.

8. A baseboard trap as defined in claim 1 including scent means for attracting crawling insects to the region of said tape.

* * * * *